H. C. WERNER.
PIPE COUPLING.
APPLICATION FILED JULY 21, 1911.
1,035,063.
Patented Aug. 6, 1912.
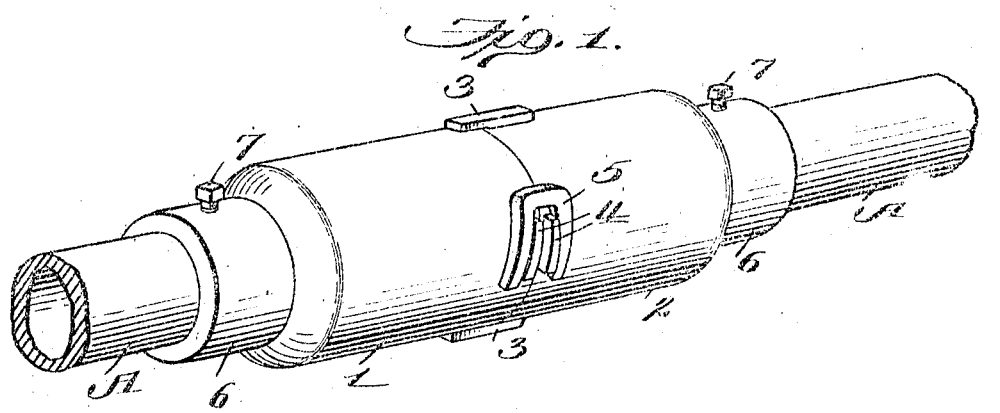
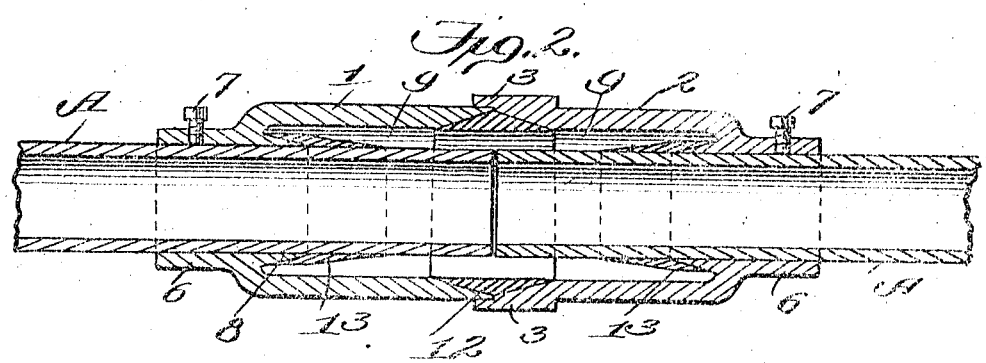
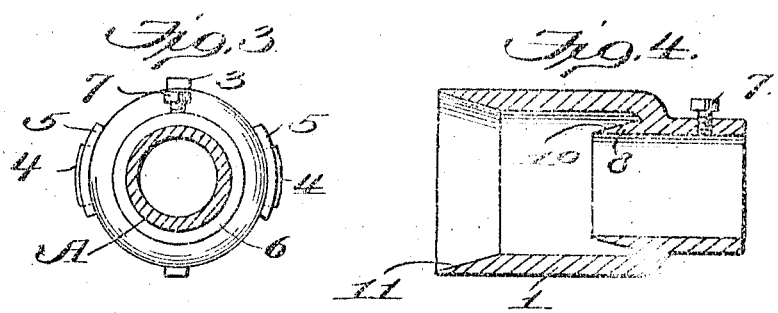
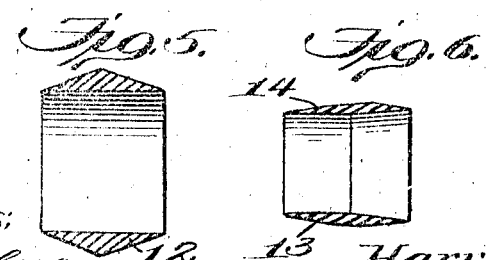
Witnesses:
Inventor
Harry C. Werner
by Amos L. Morris
Atty

UNITED STATES PATENT OFFICE.

HARRY C. WERNER, OF WHEELING, WEST VIRGINIA, ASSIGNOR OF ONE-HALF TO ED. W. WESTWOOD, OF WHEELING, WEST VIRGINIA.

PIPE-COUPLING.

1,035,063.  Specification of Letters Patent.  Patented Aug. 6, 1912.

Application filed July 21, 1911. Serial No. 639,729.

*To all whom it may concern:*

Be it known that I, HARRY C. WERNER, a citizen of the United States, residing at Wheeling, in the county of Ohio and State of West Virginia, have invented new and useful Improvements in Pipe-Couplings, of which the following is a specification.

This invention relates to improvements in pipe couplings, and proposes a pipe coupling which is more especially applicable to gas lines or to pipe systems of similar character, wherein air, gas, or other elastic fluid is maintained at a relatively high pressure in the pipes.

The principal object of the present invention is to provide a pipe coupling of simple character wherein efficient provision is made against the escape or leakage of the gas or other fluid maintained in the pipe, wherein allowance is made for the expansion and contraction of the pipes; and which shall be of simple character and relatively small cost.

An embodiment of the invention is illustrated in the accompanying drawings, wherein:

Figure 1 is a perspective view of the improved pipe coupling. Fig. 2 is a longitudinal sectional view thereof. Fig. 3 is an end elevation thereof. Fig. 4 is a sectional view of one of the members of the pipe coupling, the other member being of like construction. Fig. 5 is a sectional view of a centrally arranged sealing ring, and Fig. 6 is a sectional view of an end sealing ring.

Similar characters of reference designate corresponding parts throughout the several views.

The pipes to be connected by the improved coupling are indicated by the letter A.

The coupling comprises two companion members 1 and 2, which are associated with the respective pipes A. The members 1 and 2 may be connected in any suitable manner, and are substantially of counterpart construction. As shown in the drawings, the member 2 is provided with oppositely arranged longitudinally disposed and projecting lugs 3, the function of which is to facilitate the assemblage of the coupling by centering the members 1 and 2 with relation to one other. Said members are also provided at opposite sides thereof with transversely disposed projections 4, and at least one of the projections 4 has an inclined extreme face. The projections 4, at each side of the coupling, coöperate with a suitable fastening clip 5, which has a U-shaped form. The clips 5 straddle each pair of adjacent projections 4, and by virtue of the relative inclination of the extreme faces of said projections are effective to draw the members 1 and 2 toward one another and to efficiently clamp said members in proper relation.

The members 1 and 2 may or may not be connected to the pipes A. As shown, said members have their body portions of substantially greater diameter than said pipes, and include reduced projecting sleeves 6, which are arranged at the outer ends of the body portions of the members and conform to the diameter of the pipes A. Set screws 7, for frictional engagement with said pipes, may be threaded through the sleeve 6, if so desired.

Adjacent the sleeves 6, the members 1 and 2 are formed with inwardly extended bosses 8, which conform to the diameter of the pipes A, and which are, of course, concentric to the enlarged body portions of said members, a space 9 intervening between said enlarged body portions and said pipes. The bosses 8 have their outer faces beveled inwardly, as at 10, whereby the inner ends of said bosses have a relatively sharp edge.

The members 1 and 2 have their inner faces at their mutually adjacent ends flared, as at 11.

In connection with the coupling members constructed and arranged as described, a series of elastic sealing rings is employed, which comprises a central ring 12 and a pair of end rings 13, these rings being arranged with respect to one another in spaced relation. The ring 12 is triangular in longitudinal section, and conformably fits in the recess which is defined by the flared faces 11 of the members 1 and 2, said ring bearing tightly against said flared faces. The rings 13 have in longitudinal section the outline of a trapezium, and their inner faces are shaped to conformably and snugly surround the beveled faces 10 of the bosses 8 and, the adjacent surfaces of the pipes A, while their outer faces are inclined inwardly as at 14, throughout the greater portion of the extent of said rings.

The coupling above described is intended not so much to positively connect the mutually adjacent ends of the pipes to be coupled, as to establish a sealed joint at the mutually adjacent ends which is particularly efficient when the pipes are used as conductors for some elastic fluid. Thus, if the fluid contained in the pipes A should be under considerable pressure, whereby it has a tendency to escape at the crevice between the ends of said pipes, the effect of this action is to force the ring 12 into stronger sealing engagement with the surfaces 11 of the coupling members, and at the same time, to force the rings 13 into stronger sealing engagement with the bosses 8 and the adjacent pipe surfaces, whereby the fluid thus escaping between the ends of the pipes is confined in the space 9 and prevented from escaping therefrom.

Having fully described my invention, I claim:

1. A pipe coupling of the class described comprising a pair of counterpart coupling members and means for connecting the same, the members having their body portions of substantially greater diameter than the pipes with which they are associated and having at their relatively outer ends inwardly projecting bosses which conformably surround said pipes and a series of elastic sealing rings arranged in the space between the members and the pipes and comprising a central ring and end rings, the central ring bridging the mutally adjacent ends of the coupling members and having sealing engagement with the adjacent surfaces of said members and the end rings seating against said bosses and also surrounding and having sealing engagement with the adjacent surfaces of the pipes.

2. A pipe coupling of the class described comprising a pair of counterpart coupling members and means for connecting the same, the members having their body portions of substantially greater diameter than the pipes with which they are associated and having at their relatively outer ends inwardly projecting bosses which conformably surround said pipes, the bosses having their outer faces beveled inwardly and the members having their mutually adjacent ends flared, and a series of elastic sealing rings arranged in the space between the members and the pipes and comprising a central ring and end rings, the central ring being triangular in longitudinal section and bridging the mutually adjacent ends of the coupling members and having sealing engagement with the adjacent surfaces of said members and the end rings having in longitudinal section the outlines of trapeziums and seating against said bosses and also surrounding and having sealing engagement with the adjacent surfaces of the pipes.

3. The combination with adjacent pipes of a coupling therefor comprising a pair of counterpart members one of which is associated with each pipe and which have their mutually adjacent ends formed to provide a seat for a sealing ring, a sealing ring fitted in the said seat and adapted to be pressed tightly thereagainst by the pressure of any fluid which may escape through the space between the pipes, an internal projection formed on each coupling member and a sealing ring seated upon each projection and which is adapted to be pressed against the surface of the pipes by the pressure of any fluid which may escape through the space between the pipes.

4. The combination with adjacent pipes of a coupling therefor comprising a pair of counterpart coupling members one of which is associated with each pipe, a sealing ring which bridges the mutually adjacent ends of the members and is designed to seat against said mutually adjacent ends and to be held in sealing engagement therewith by the pressure of any fluid which may escape through the space between the pipes, and means for sealing the joint between the pipes and the coupling members at the end of the coupling, the said means including sealing rings which are adapted to be held in stronger sealing engagement by the pressure of any fluid which may escape through the space between the pipes.

In testimony whereof I have hereunto set my hand in presence of two subscribing witnesses.

HARRY C. WERNER.

Witnesses:
P. L. GRAHAM,
M. M. O. OLDHAM.